United States Patent
Magneron

(10) Patent No.: US 7,335,443 B2
(45) Date of Patent: Feb. 26, 2008

(54) ELECTRIC COUPLING OF A CONNECTION TO A TERMINAL

(75) Inventor: Frederic Magneron, Poitiers Cedex (FR)

(73) Assignee: Saft Group SA, Bagnolet (FR)

( * ) Notice: Subject to any disclaimer, the term of this patent is extended or adjusted under 35 U.S.C. 154(b) by 659 days.

(21) Appl. No.: 10/815,685

(22) Filed: Apr. 2, 2004

(65) Prior Publication Data
US 2004/0219425 A1 Nov. 4, 2004

(30) Foreign Application Priority Data
Apr. 4, 2003 (FR) .................................. 03 04260

(51) Int. Cl.
*H01M 2/30* (2006.01)
*H01M 2/08* (2006.01)
*H01M 10/04* (2006.01)

(52) U.S. Cl. ...................... 429/179; 429/184

(58) Field of Classification Search ........ 429/179–181, 429/184
See application file for complete search history.

(56) References Cited

U.S. PATENT DOCUMENTS

| | | | |
|---|---|---|---|
| 4,042,756 A | 8/1977 | Goebel et al. | |
| 4,347,293 A | 8/1982 | Goebel et al. | |

FOREIGN PATENT DOCUMENTS

| | | |
|---|---|---|
| EP | 0118657 | 9/1984 |
| FR | 2 513 806 | 9/1981 |
| FR | 2585185 | 7/1985 |
| JP | 9153368 | 6/1997 |
| JP | 2002373641 A | * 12/2002 |

* cited by examiner

Primary Examiner—Gregg Cantelmo
(74) Attorney, Agent, or Firm—Sughrue Mion, PLLC

(57) ABSTRACT

A system for electric coupling of a flat connection to a current output terminal comprising a tubular conducting slug is provided in which the connection comprises a hole and the connection is fixed on a transversal section of the slug in such a manner as to cause the hole to communicate with the inside of the tube.

2 Claims, 4 Drawing Sheets

ELECTRIC COUPLING OF A CONNECTION TO A TERMINAL

BACKGROUND OF THE INVENTION

The present invention relates to the electric coupling of an electrode connection to a current output terminal, and in particular a terminal of the "glass-metal bushing" type usually used in small-format electrochemical generators. The invention relates in particular to electrochemical generators intended for portable equipment, the capacity of which is generally less than 20Ah, particularly but not exclusively for sealed lithium generators. The invention moreover extends to the method for producing this coupling.

An electrochemical generator comprises an electrochemical bundle comprising an alternating sequence of positive and negative electrodes framing a separator impregnated with electrolyte. Each electrode most often comprises a metal current collector supporting on at least one of its surfaces the electrochemically active material. The electrode is connected electrically to a current output which ensures electrical continuity between the electrode and the external application with which the generator is associated. This current output can be the container of the generator or a current output terminal.

The generator housing has holes receiving devices allowing the electrochemical bundle and its environment to be connected to the outside, such as current input and output terminals and a safety device in the case of internal overpressure. The generator housing can also have a hole for the introduction of a liquid electrolyte.

The terminals of an electrochemical generator have a double function: on the one hand to ensure electrical continuity between the electrodes of the electrochemical generator and the external application with which it is associated, on the other hand to contribute to the tightness of the generator's closure. The terminal passes through the wall of the container of the generator: the part situated outside the container receives the connections originating from the application, the part situated inside is connected to the electrodes. This terminal can be integral with or mounted on the container. When it is mounted on the container, a sealing and electrical insulation gasket is usually provided between the current output and the container of the generator. The so-called "glass-metal bushing" (GMB) type terminals are constituted by a central metal slug ensuring electrical continuity, surrounded by a glass gasket, tightly connected on the one hand to the central slug, and on the other hand to the wall of the container, for example the cover, into which the terminal is inserted. These GMB terminals are generally small in size, and the central slug has a diameter smaller than its length. By way of example, its diameter is comprised between 1.5 and 2 mm and its length is comprised between 5 and 8 mm, the diameter of the terminal being comprised between 10 and 17 mm.

There are several ways of electrically coupling an electrode to a current output terminal One of these ways is the use of a thin conducting strip or thin metal band, one end of which is welded to the edge of the collector of the electrode and the other end is welded to the part of the terminal situated inside the container. In practice, in order to connect an electrode to a current output, for example to a terminal which passes through a cover, the end of the thin strip is positioned, held and fixed on the internal part of the terminal. The generator is then closed using the cover.

When the electrochemical generator contains a liquid electrolyte, it is necessary to provide a filler hole, generally in the cover. In the case of generators which are small in size, this hole can be arranged on the actual inside of the current output terminal, in order to gain space on the cover. This is the case for example of the generator described by the document JP-60,023,970 which comprises a hollow GMB terminal in order to allow the introduction of the electrolyte. The filler hole is then closed by a rod inserted into the tube, then narrowing of the tube is carried out by caulking, finally the hole is sealed by laser welding. The electric coupling is carried out by a connection fixed to the lateral cylindrical surface of the internal part of the slug.

In this embodiment, the positioning of the thin strip vis-a-vis the internal part of the terminal as well as holding it before its fixing proves awkward. The closing of the cover then engenders a complex folding of the connection. During this operation, there is a risk of damaging the fixing of the thin strip to the terminal, or even the thin strip itself. The resultant risks are on the one hand the occurrence of short-circuits and on the other hand the closure of the lower part of the electrolyte filler hole.

SUMMARY OF THE INVENTION

The present invention aims to eliminate the drawbacks of the prior art and, in particular, the risk of closing the hole for introducing the electrolyte. To this end, it proposes an electrochemical generator in which the electric coupling of the connection to the terminal eliminates this risk. It also proposes a method for manufacturing this generator.

The subject of the present invention is a system for electrical coupling of a plane connection to a current output terminal comprising a hollow conducting slug of tubular shape. The connection comprises a hole and it is fixed to a transversal section of the slug in such a manner as to cause this hole to communicate with the inside of the slug.

Thus the total height of the slug, i.e. the size of the system, can be reduced in comparison with a system in which the connection would be fixed to a lateral surface of the slug.

The connection is preferably welded to the slug in order to ensure a reliable electric contact. Moreover, it is noted that the behaviour during a pullout test of such a fixing is much better than that observed for a connection welded to the lateral surface of the slug.

A subject of the invention is also an electrochemical generator including a system for electric coupling of a plane connection, electrically connected to one of the electrodes, to a current output terminal comprising a central conducting slug, said slug being in the shape of a tube, one end of which opens towards the outside and the other end opens towards the inside of said generator, wherein said connection comprises a hole and is welded to the internal transversal surface of said slug in such a manner as to cause said hole to coincide with the inside of said slug.

In this case the length of the connection, necessary for the positioning of the coupling, is smaller than in known generators. A shorter length facilitates the positioning of the connection inside the generator whilst it is closed. Thus short-circuits are avoided. Moreover, the risk of obstruction of the internal channel of the slug is eliminated due to the presence of a hole in the connection and the holding in place of this hole relative to the slug.

Said current output terminal is preferably constituted by at least one central tubular conducting slug surrounded by an annular glass seal.

A subject of the invention is also a process for producing a system for electric coupling of a plane connection to a current output terminal comprising a tubular conducting slug. The method comprises the following steps: the connection is placed on a transversal end of the slug, then the connection is fixed on the end, and finally the connection is pierced.

The connection is first placed on a transversal end of the slug which is held using a clamp. The position of the connection on the terminal has the advantage of preserving the visibility of the site where the fixing is carried out throughout the operation.

Advantageously the connection is welded to the slug in such a manner as to ensure a reliable fixing. The connection is preferably welded to the slug electrically. In this case the clamp can constitute a first welding electrode the position of which remains fixed during the welding operation and the connection is welded electrically to the slug using a second welding electrode which is movable, in order to be placed precisely in the welding position.

Finally said connection is pierced using a tool introduced inside said slug in order to make a hole. Advantageously this hole is obtained by cutting and pushing in order to obtain a lance. Thus the piercing does not produce chips, nor metal dust capable of remaining inside the generator and causing short-circuits. Moreover the piercing of the connection after fixing of the latter to the slug guarantees the alignment of the inside of the tube and of the hole produced.

A subject of the invention is also a method for manufacturing an electrochemical generator including a system for electric coupling of a plane connection to a current output terminal comprising a tubular conducting slug, said method comprising the following steps:

said slug is held using a clamp constituting a first welding electrode, the position of which is preferably fixed.
said connection is placed on the internal transversal end of said slug,
said connection is electrically welded to said end using a second electrode, which is preferably mobile, in order to be brought into the welding position,
said connection is pierced using a tool introduced inside said slug in such a manner as to make a hole by cutting and pushing of material.

After introduction of the electrolyte into the electrochemical generator, the internal channel of the slug is closed using a metal rod. Advantageously the internal diameter of the hole of the connection is smaller than the internal diameter of the slug. Thus the metal rod is retained and does not fall into the generator. There is therefore no need to crimp or caulk the rod in order to hold it in place during the production of the closing weld.

The invention will be understood better and other advantages and features will become apparent on reading the description which follows, provided of course by way of illustration, and non-limitatively, and with the attached drawing.

DETAILED DESCRIPTION OF PREFERRED EMBODIMENTS

Figure 1:
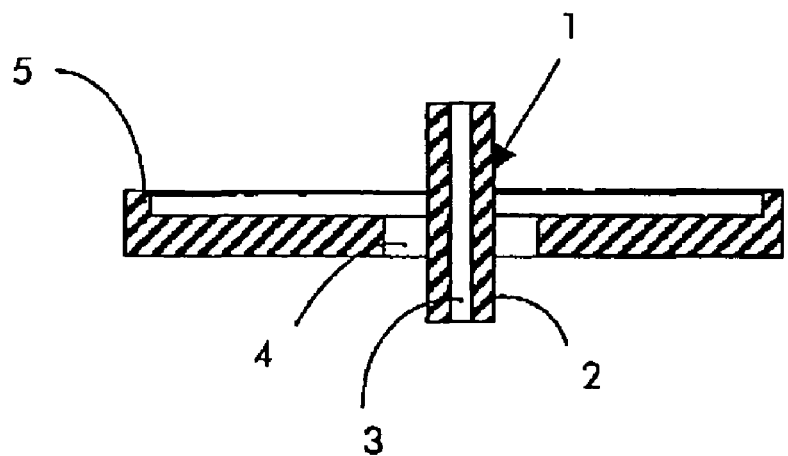
FIG. 1 is a cross-section of a current output terminal of the "glass-metal bushing" (GMB) type, the central slug of which comprises an internal channel for the introduction of a liquid electrolyte.

FIG. 1 represents a cross-section of a current output terminal 1 of the "glass-metal bushing" type (GMB). The terminal comprises a central hollow slug 2 comprising an internal channel 3 serving as a passage for the introduction of the electrolyte during filling. The tubular central slug 2 is surrounded by an annular glass seal 4 which serves as a connection with the cover 5 of the accumulator. The cover 5 is made of metal and can be used as a terminal for the opposite polarity.

Figure 2:
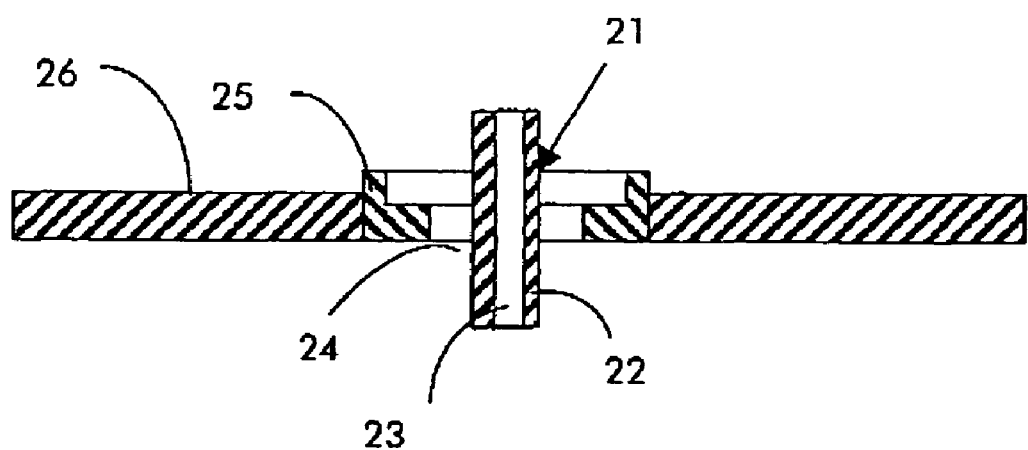
FIG. 2 is a cross-section of the cover of an electrochemical generator comprising a current output terminal of the GMB type the central slug of which comprises an internal channel for the introduction of a liquid electrolyte.

FIG. 2 represents a variant 21 of the same type of terminal, but intended to be used for generators with larger dimensions. The terminal comprises a central slug 22, equipped with an internal channel 23 for the electrolyte to pass through, and surrounded by a glass seal 24. This seal is connected to a metal dish 25 which can for example be welded to the cover 26 of a generator.

Figure 3:
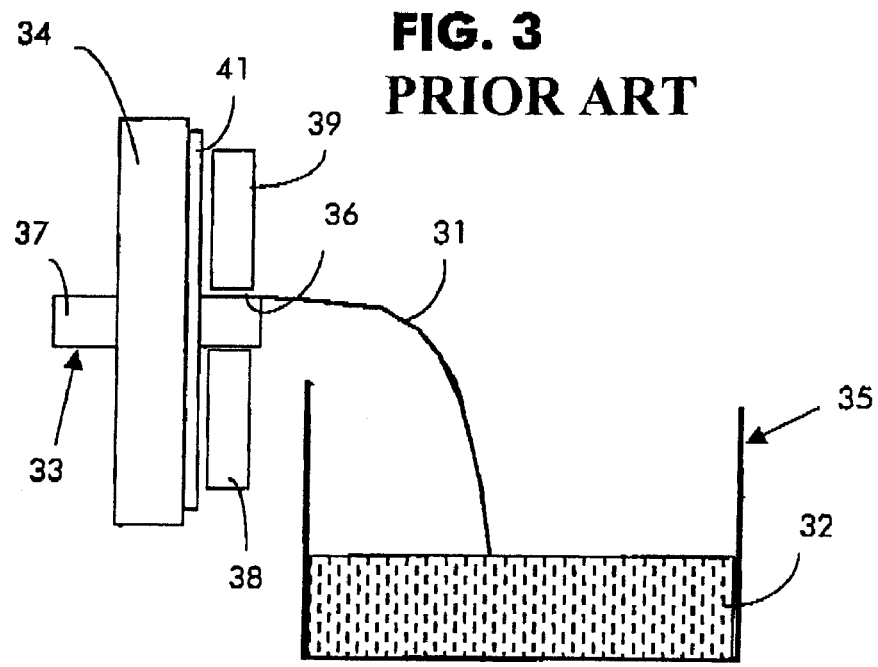
FIG. 3 shows the operation of electrically coupling an electrode connection to a GMB terminal according to the prior art.
Figure 4:
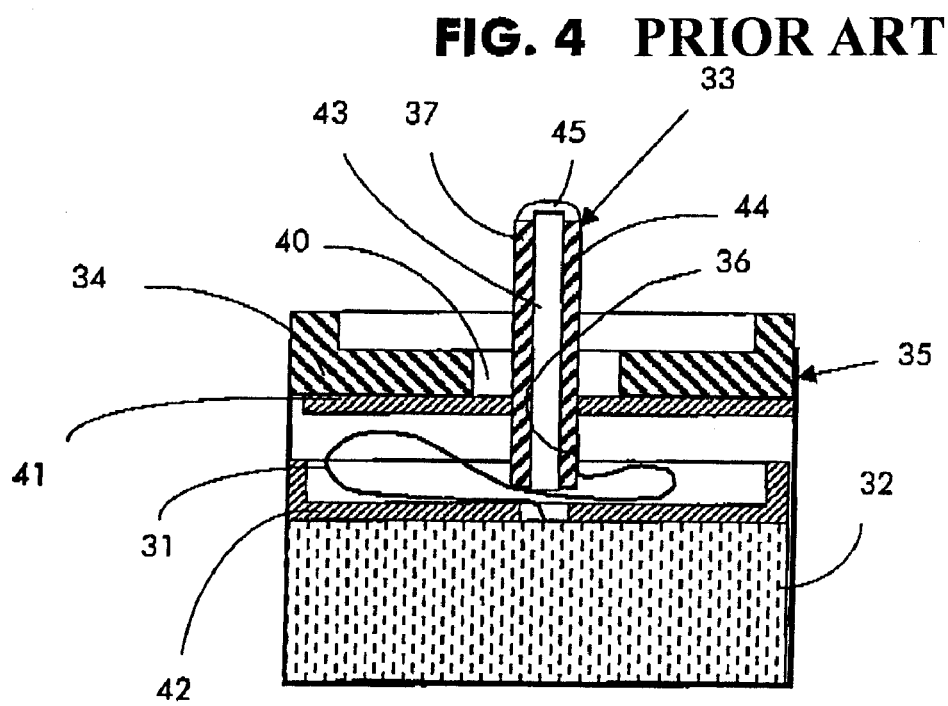
FIG. 4 represents a partial cross-section of an electrochemical generator in which the electrode is electrically coupled to a GMB terminal according to the prior art.

FIGS. 3 and 4 show an electric coupling according to the prior art between a connection 31 connected to the electrochemical bundle 32 and a current output terminal 33 inserted into the cover 34 of a generator 35.

FIG. 3 shows that the connection 31 must be sufficient in length to be able to be placed on the lateral surface 36 of the slug 37 of the terminal 33. The connection 31 is then welded to the lateral surface 36 of the slug 37 between a fixed electrode 38 and a mobile electrode 39. The cover 34 is then folded down in order to close the generator 35.

FIG. 4 is a cross-section of the generator 35 once the cover 34 is closed. It shows the slug 37 surrounded by a glass seal 40 which connects it to the cover 34. During closing, the connection 31 takes on the shape of a flattened "S" in order to be able to be accommodated between the electrochemical bundle 32 and the cover 34 by passing under the base of the slug 37 at the risk of preventing the passage of the electrolyte. The electrical insulation between the cover 34 and the connection 31 is ensured by an upper insulating disk 41. An insulating disk 42 in the shape of a dish is necessary in order to ensure the insulation between the connection 31 and the electrochemical bundle 32. After introduction of the electrolyte a stud 43 is inserted into the internal channel 44 of the slug 37 and its top end 45 is welded in order to ensure the tightness of the generator 35.

Figure 5:
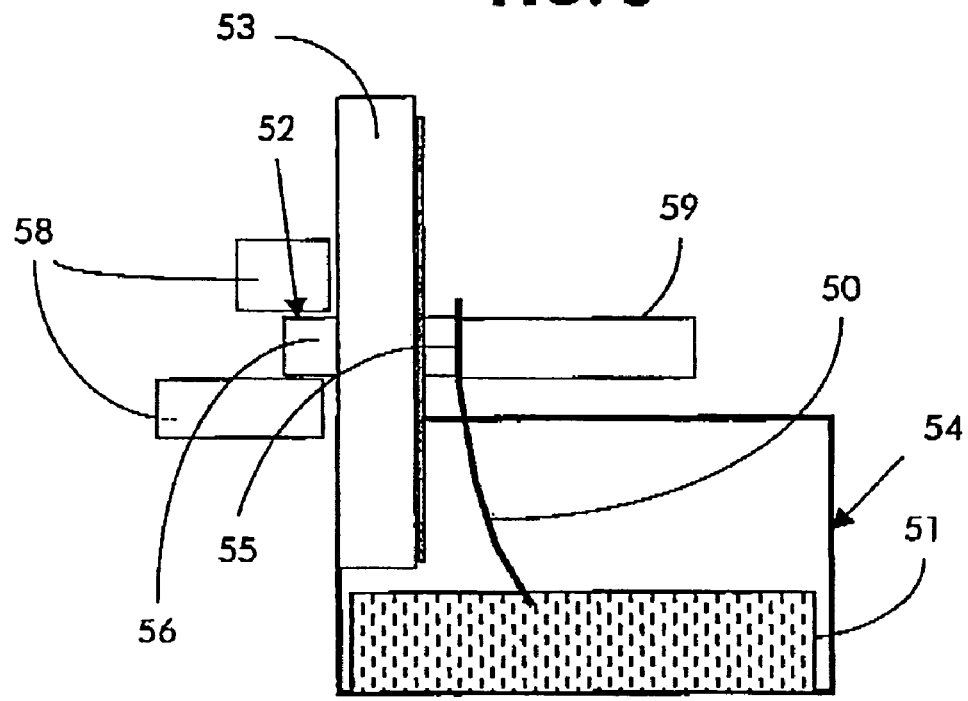
FIG. 5 shows the operation of electrically coupling an electrode connection to a GMB terminal according to the present invention.
Figure 6:
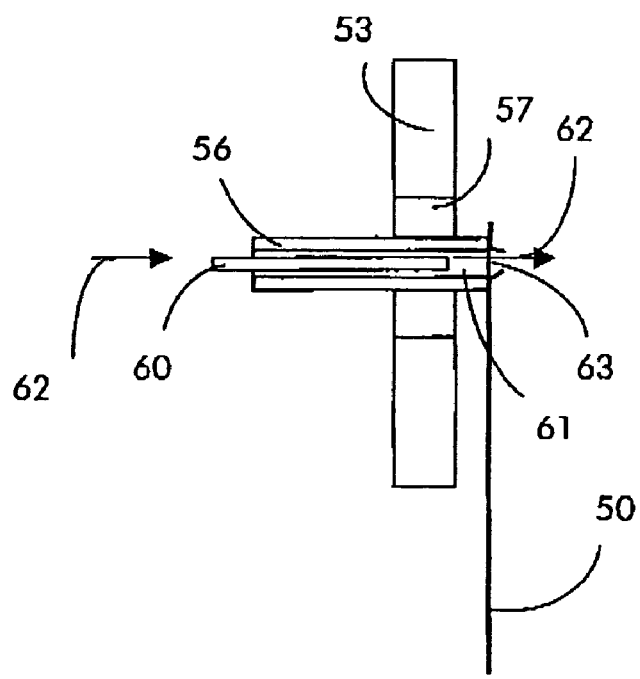
FIG. 6 shows the operation of piercing the connection after fixing to the slug.
Figure 7:
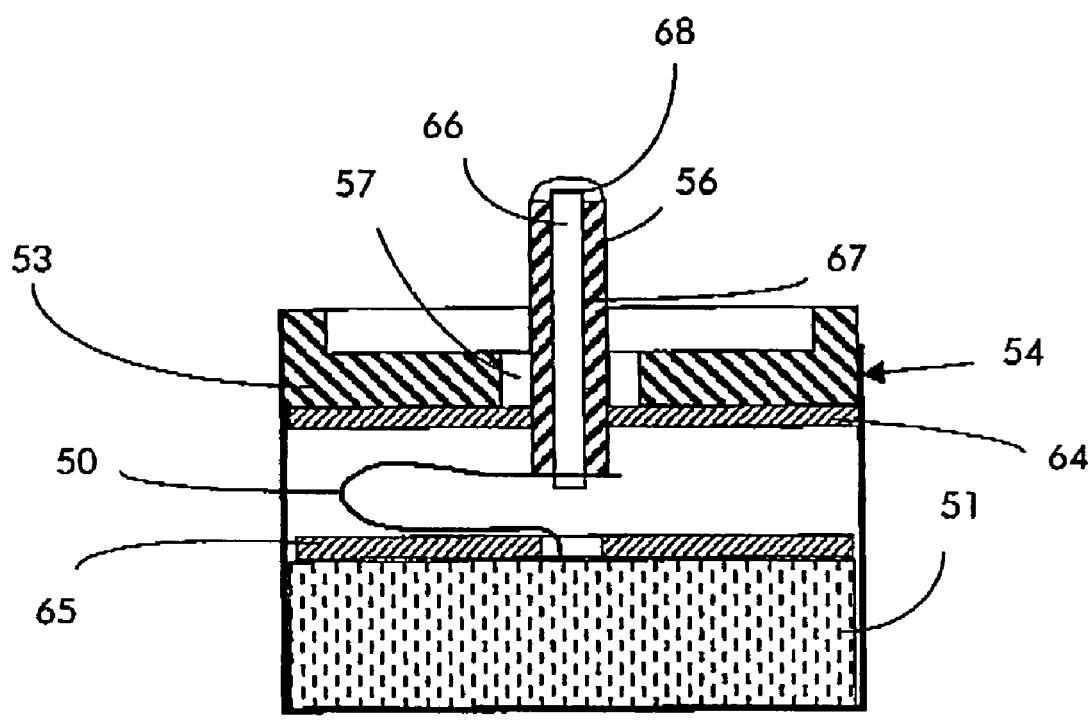
FIG. 7 represents a partial cross-section of an electrochemical generator in which the electrode is electrically coupled to a GMB terminal according to the present invention.

FIGS. 5 to 7 show an electric coupling according to the invention between a connection 50 connected to the electrochemical bundle 51 and a current output terminal 52 inserted into the cover 53 of a generator 54.

FIG. 5 shows that the connection 50 is much shorter in length than the connection 31 in FIG. 3. This length is however sufficient to allow it to be placed on the transversal surface 55 of the slug 56 surrounded by a glass seal 57 forming the terminal 52. The connection 50 is then welded to the end 55 of the slug 56 between a clamp serving as fixed counter-electrode 58 and a mobile electrode 59.

A metal rod 60 is then introduced into the internal hollow part 61 of the slug 56, as represented in FIG. 6, and a pressure in the direction of the arrows 62 is exerted on the rod 60 in order to create a hole 63. The cover 53 is then folded down in order to close the generator 54.

FIG. 7 is a cross-section of the generator 54 once the cover 53 is closed. It shows the slug 56 surrounded by the glass seal 57 which connects it to the cover 53. During closing, the connection 50 adopts the shape of a recumbent "U" lying down, in order to be accommodated between the electrochemical bundle 51 and the cover 53. The shape adopted by connection 50 removes any risk regarding the obstruction of the channel for introduction of the electrolyte. The electrical insulation between the cover 53 and the connection 50 is ensured by an upper insulating disk 64. A plane insulating disk 65 suffices to ensure the insulation between the connection 50 and the electrochemical bundle 51. After introduction of the electrolyte a stud 66 is inserted into the internal channel 67 of the slug 56 and its upper end 68 is welded in order to ensure the tightness of the generator.

What is claimed is:

1. A generator comprising a system for electric coupling of a plane connection on a current output terminal comprising a tubular conducting slug, in which said connection comprises a hole and in that said connection is fixed on a transversal section of said slug in such a manner as to cause this hole to communicate with the inside of said tube, the generator comprising a plane connection connected electrically to one of the electrodes and a current output terminal comprising a central conducting slug surrounded by an annular glass seal, said slug being in the shape of a tube one end of which opens towards the outside and the other end opens towards the inside of said generator, wherein said connection comprises a hole and is welded to the internal transversal face of said slug in such a manner as to cause said hole to coincide with the inside of said slug, wherein the internal diameter of said hole is smaller than the internal diameter of said slug.

2. The generator according to claim 1, in which said current output terminal is constituted by at least one tubular conducting central slug surrounded by an annular glass seal.

* * * * *